April 21, 1936. H. A. CURTIS 2,037,706
MANUFACTURE OF AMMONIATED SUPERPHOSPHATES
Filed June 16, 1934
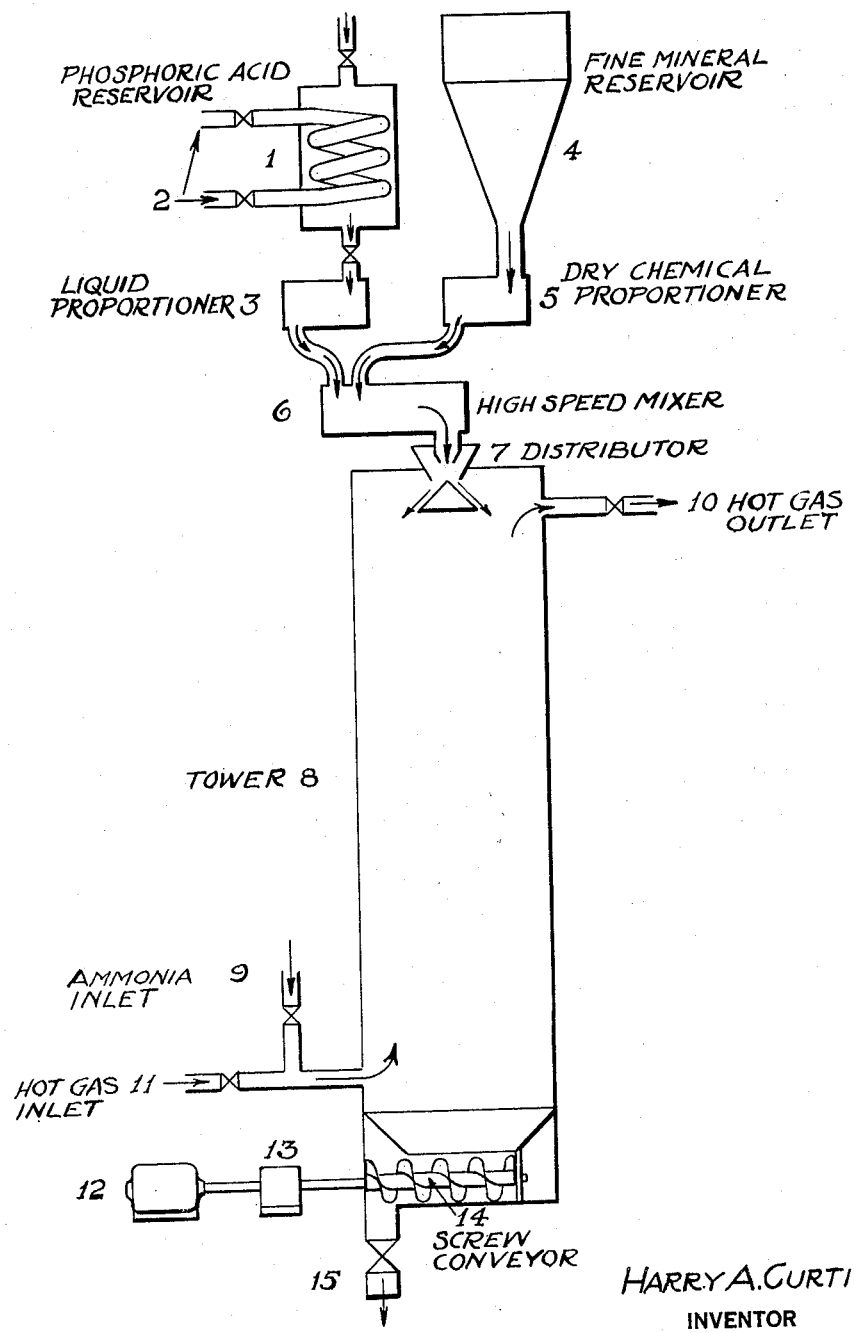
HARRY A. CURTIS
INVENTOR
BY Arthur L. Davis
ATTORNEY Patented Apr. 21, 1936

2,037,706

UNITED STATES PATENT OFFICE 2,037,706

MANUFACTURE OF AMMONIATED SUPERPHOSPHATES

Harry A. Curtis, Knoxville, Tenn., assignor to Tennessee Valley Authority, Wilson Dam, Alabama, a corporation of the United States of America Application June 16, 1934, Serial No. 730,992

6 Claims. (Cl. 71—7)

(Granted under the act of March 3, 1883, as amended April 30, 1928; 370 O. G. 757)

The application is made under the act of April 30, 1928, and the invention herein described, if patented, may be manufactured and used by or for the Government for governmental purposes without the payment to me of any royalty thereon.

This invention relates to the process for the manufacture of ammoniated phosphates; and particularly to ammoniated superphosphates made by the ammoniation of triple superphosphates for use as concentrated fertilizer materials.

One of the objects of this invention is the provision for a continuous process for the production of ammoniated superphosphates from limestone or phosphate rock and phosphoric acid. Another object of my invention is to provide an improvement in the treatment of the substantially spherical particles of the limestone or phosphate rock and phosphoric acid mixture. Another object of this invention is the utilization of the heat produced by the reaction of the ammonia for aid in the final steps of the dehydration of the spherical granules. Still another object of this invention is the provision for a continuous means for the production of ammoniated phosphates from solid chemical materials reactive with phosphoric acid. Other objects include the manufacture of concentrated fertilizers or concentrated fertilizer ingredients and the production of these materials in such a physical condition that a more uniform distribution in the soil may be made.

Mono-calcium phosphate, known commercially as triple superphosphate, prepared by the action of phosphoric acid on limestone or phosphate rock, emerges from the respective processes as hard, discrete masses which require grinding to reduce them to suitable size for mixing with other fertilizer ingredients or for direct distribution to the soil. A process of and apparatus for the manufacture of calcium phosphates is disclosed in my copending app. Ser. No. 726,757, filed May 21, 1934. This fine triple superphosphate may be ammoniated by the use of either an aqueous solution of ammonia or anhydrous ammonia or both to make ammoniated superphosphate, but in any event the final product is made up of particles of suitable size but with irregular shapes which tend to interfere with the uniform flow of small streams of the materials during application.

I have found that, by controlling the conditions of reaction for fine solid chemical materials, reactive with phosphoric acid, the initial mixture of partially reacted material may be distributed into a tall tower in such a manner as to form substantially spherical particles, which become substantially completely reacted and partially dehydrated by falling countercurrent to a heated stream of ascending gas, and these substantially spherical particles may be ammoniated and further dehydrated by continuing the fall through the tower countercurrent to the heated stream of ascending gas containing gaseous ammonia resulting in a product which reaches the bottom of the tower in the form of hard, discrete spheres not exceeding a predetermined size. The proportions of ammonia and hot inert gas are so adjusted that the partial pressure of the ammonia is greater than the vapor pressure of ammonia above the predominating ammonium compound in the product at the temperature of the reaction zone and less than the vapor pressure of ammonia over the next higher vapor pressure compound of the series for the same temperature of reaction zone. The vapor pressures of ammonia above the ammonium orthophosphates included in the data presented in the paper of Ross, Merz and Jacob on the Preparation and properties of ammonium phosphates published in Industrial and Engineering Chemistry 21, 286 (1929) March, are as follows:

| Compound | Ammonia vapor pressure, mm. hg. | |
|---|---|---|
| | 100° C. | 125° C. |
| Mono-ammonium phosphate | 0.0 | 0.05 |
| Di-ammonium phosphate | 5.0 | 30 |
| Tri-ammonium phosphate | 643 | 1,170 |

The reactions involved in the manufacture of the mono-calcium phosphate from limestone and phosphate rock with phosphoric acid are as follows:

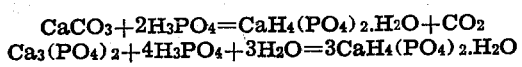

$$CaCO_3 + 2H_3PO_4 = CaH_4(PO_4)_2 \cdot H_2O + CO_2$$
$$Ca_3(PO_4)_2 + 4H_3PO_4 + 3H_2O = 3CaH_4(PO_4)_2 \cdot H_2O$$

Magnesian limestone, which is dolomitic limestone with 5 to 18 percent magnesium carbonate, and dolomite react with phosphoric acid in like manner to form mixed calcium magnesium phosphates.

The reactions involved in the ammoniation of mono-calcium phosphate are as follows:

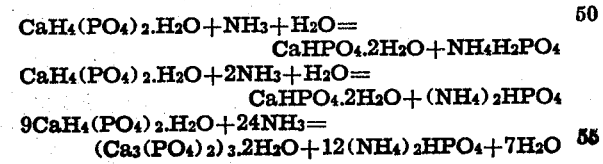

$$CaH_4(PO_4)_2 \cdot H_2O + NH_3 + H_2O =$$
$$CaHPO_4 \cdot 2H_2O + NH_4H_2PO_4$$
$$CaH_4(PO_4)_2 \cdot H_2O + 2NH_3 + H_2O =$$
$$CaHPO_4 \cdot 2H_2O + (NH_4)_2HPO_4$$
$$9CaH_4(PO_4)_2 \cdot H_2O + 24NH_3 =$$
$$(Ca_3(PO_4)_2)_3 \cdot 2H_2O + 12(NH_4)_2HPO_4 + 7H_2O$$

It is possible to add 8 to 10 percent of ammonia without the formation of significant quantities of citrate-insoluble phosphoric acid as indicated by the last equation above.

A diagrammatic vertical section of one form of apparatus for the embodiment of my process is shown in the accompanying drawing. The phosphoric acid reservoir 1, fitted with the heating element 2, supplies the charge to the liquid proportioner 3, and the fine mineral reservoir 4, supplies the charge to the dry chemical proportioner 5; the phosphoric acid and the fine mineral pass from the liquid proportioner 3, and the dry chemical proportioner 5, respectively, into the high speed mixer 6, which delivers the partially reacted fluid mixture to the distributor 7, placed in the tower 8; the dispersed masses from the distributor 7, fall countercurrent to the stream of hot gas admitted near the bottom of the tower thru valved line 9, and withdrawn from near the top of the tower through valved line 10; as the particles fall in contact with the hot gas and become substantially completely reacted and partially dehydrated they reach a zone in the bottom of tower 8, which contains ammonia admixed with the hot gas entering the tower and admitted through valved line 11; the motor 12, through the speed reducer 13, drives the screw conveyor 14, located in the bottom of tower 8, and discharges the accumulated product, which has fallen to the bottom of the tower, through the valved outlet 15.

One example of the operation of my process is given for the manufacture of ammoniated superphosphate from phosphate rock, phosphoric acid and anhydrous ammonia: 100 mesh phosphate rock of 33 to 34 percent $P_2O_5$ content may be fed at the rate of 142 pounds per minute along with 65 percent phosphoric acid which has been heated to 100° C. at the rate of 131 pounds of $H_3PO_4$ per minute into a high speed mixer. The partially reacted mixture, while still fluid, is rapidly discharged through a distributor in such a manner that the fluid particles may assume a substantially spherical shape and of such size that the bulk of the finished particles pass through a four mesh screen. The spherical particles fall through the tower countercurrent to a rising column of heated air until their reaction is practically complete and the particles at least partially dehydrated and then contact an atmosphere of ammonia in the lower portion of the tower which has been formed by admixing 17 pounds of ammonia per minute with air in respective volume ratios of 25 to 735 and admitting the mixture to the bottom of the tower at a temperature of 125° C., reaching the bottom of the tower in the form of dry, hard, substantially spherical granules.

It is evident that there are numerous factors which will influence the conditions for the most satisfactory operation of my process, the actual limits of which cannot be established except by a detailed study of each set of raw materials and finished products involved. In the case of the manufacture of ammonium superphosphates from either limestone or phosphate rock, phosphoric acid and ammonia there are conditions of operation which will be set forth. The phosphoric acid may be used dilute at a relatively high temperature, and the more concentrated acid may be used at a relatively low temperature, but in any event, the temperature will not ordinarily exceed 150° C. The concentration and temperature of the acid may be adjusted, respectively, in order that the proper rate of reaction will result in a partially reacted mixture of the proper fluidity for distribution in the tower. Either one or both of the reactants may be heated to produce the same effect. The solid reactant may be heated by means especially provided for the purpose or may be obtained in that condition as a preliminary step, such as a roasting process. The fluid, partially reacted mixture may be sprayed into the tower by any well known means for distributing or otherwise dispersing fluid media of this character so that the formation of substantially spherical particles may be effected. The relative positions of the mixer and distributor should be maintained the shortest possible distance apart since the speed of reaction at the higher temperatures is so rapid that it takes only relatively a few seconds after intimate contact of the solid chemical material and the acid for the fluid mixture to congeal. The distribution may take place either at the top of the tower or at some lower point in the tower. In the latter event, the space above the point of distribution will serve as a means for separation of the finely divided particles which may be carried by the hot gas which has been in contact with the particles in the tower. The hot gases used in the tower may be air heated by direct or indirect firing, or other suitable gas which may be heated so that a predetermined temperature may be maintained in the reaction zone in the bottom of the tower. The substantially spherical particles of partially reacted fluid mixture fall through the tower countercurrent to the rising hot gases and in this manner particles substantially completely reacted and partially dehydrated reach a lower zone in the tower. In this zone they come in contact with ammonia vapor, which has been admitted along with the hot gases near the bottom of the tower, and continue to fall to the bottom of the tower, absorbing ammonia vapor, reacting with them, and further dehydrating the particles. In certain instances it may be desirable to permit the partially reacted particles to fall countercurrent to the hot inert gas in one tower and, after transferring to the top of a second tower, permit the particles to fall countercurrent to the mixture of the ammonia and inert gas. When two towers are used, it will be possible to exercise greater latitude in the control of the temperature ranges existing in each of the towers. Where moderate ammoniation of the phosphates is desired with the resulting mixture probably being di-calcium phosphate and mono-ammonium phosphate, only a limited quantity of ammonia is admitted to the hot gas stream, the concentration in this stream being adjusted so that the partial pressure of ammonia in the gas mixture will be greater than the vapor pressure of ammonia above mono-ammonium phosphate and less than the vapor pressure of ammonia above di-ammonium phosphate at the temperature of the reaction zone. In those cases in which it is considered desirable to carry the ammoniation further so that the resulting product will probably be substantially di-calcium phosphate and di-ammonium phosphate, the proportion of ammonium in the hot gas mixture should be adjusted so that its partial pressure in the mixture will be greater than the vapor pressure of ammonia above di-ammonium phosphate and less than the vapor pressure of ammonia above tri-ammonium phosphate at the temperature of the reaction zone. Substantially stoichiometric proportions of the chemically active constituents of both the solid and liquid reactants are used in all cases; while in the case of the gaseous reactants, varying amounts may be used such as up to 10% by weight in the case of ammoniated mono-calcium phosphates. I do not wish to limit myself by these values which are presented to show what are considered desirable operating values.

Certain terms used throughout the description and claims are understood to have the following meaning: solid chemical materials refer to crude materials, such as minerals, and materials of high as well as intermediate states of purity; concentrated acid refers to strong, but not necessarily anhydrous material with the concentrations preferred being 65% or more, hot gases refer to a single heated gas or heated mixture of gases with heat derived from any convenient source or by any suitable means, but with such heated gases having no substantial chemical reactivity as far as the material with which it comes in contact is concerned; and ammoniated phosphates refer to double salts and mixed salts as well as mixtures of metal phosphates and ammonium phosphates.

I claim:

1. Process of making an ammoniated superphosphate, containing mono-ammonium phosphate and free from other ammonium phosphates, from limestone and concentrated phosphoric acid, which comprises, contacting continuously the fine limestone and the concentrated phosphoric acid to form a fluid, partially reacted mixture; spraying the fluid, partially reacted mixture into a tower for the formation of spherical particles; contacting the spherical particles counter-currently with a heated inert gas to form substantially completely reacted spherical particles; and contacting the completely reacted spherical particles with a mixture of an inert gas and ammonia containing ammonia in such proportions that the partial pressure of ammonia is greater than the vapor pressure of ammonia above mono-ammonium phosphate and less than the vapor pressure of ammonia above di-ammonium phosphate at the temperature of the reaction zone.

2. Process of making an ammoniated superphosphate, containing di-ammonium phosphate and free from other ammonium phosphates, from limestone and concentrated phosphoric acid, which comprises, contacting continuously the fine limestone and the concentrated phosphoric acid to form a fluid, partially reacted mixture; spraying the fluid, partially reacted mixture into a tower for the formation of spherical particles; contacting the spherical particles counter-currently with a heated inert gas to form substantially completely reacted spherical particles; and contacting the completely reacted spherical particles with a mixture of an inert gas and ammonia containing ammonia in such proportions that the partial pressure of ammonia is greater than the vapor pressure of ammonia above di-ammonium phosphate and less than the vapor pressure of ammonia above tri-ammonium phosphate at the temperature of the reaction zone.

3. Process of making an ammoniated superphosphate, containing mono-ammonium phosphate and free from other ammonium phosphates, from phosphate rock and concentrated phosphoric acid, which comprises, contacting continuously the fine phosphate rock and the concentrated phosphoric acid to form a fluid, partially reacted mixture; spraying the fluid, partially reacted mixture into a tower for the formation of spherical particles; contacting the spherical particles counter-currently with a heated inert gas to form substantially completely reacted spherical particles; and contacting the completely reacted spherical particles with a mixture of an inert gas and ammonia containing ammonia in such proportions that the partial pressure of ammonia is greater than the vapor pressure of ammonia above mono-ammonium phosphate and less than the vapor pressure of ammonia above di-ammonium phosphate at the temperature of the reaction zone.

4. Process of making an ammoniated superphosphate, containing di-ammonium phosphate and free from other ammonium phosphates, from phosphate rock and concentrated phosphoric acid, which comprises, contacting continuously the fine phosphate rock and the concentrated phosphoric acid to form a fluid, partially reacted mixture; spraying the fluid, partially reacted mixture into a tower for the formation of spherical particles; contacting the spherical particles counter-currently with a heated inert gas to form substantially completely reacted spherical particles; and contacting the completely reacted spherical particles with a mixture of an inert gas and ammonia containing ammonia in such proportions that the partial pressure of ammonia is greater than the vapor pressure of ammonia above di-ammonium phosphate and less than the vapor pressure of ammonia above tri-ammonium phosphate at the temperature of the reaction zone.

5. Process of making an ammoniated superphosphate, containing an ammonium phosphate free from other ammonium phosphates, from a calcium containing material, selected from the group comprising phosphate rock and a calcium carbonate, and concentrated phosphoric acid, which comprises, contacting continuously the fine calcium containing material and the concentrated phosphoric acid to form a fluid, partially reacted mixture; spraying the fluid, partially reacted mixture into a tower for the formation of spherical particles; and contacting the spherical particles counter-currently with a mixture of inert gas and ammonia containing ammonia in such proportions that the partial pressure of the ammonia is greater than the vapor pressure of ammonia above the ammonium phosphate being formed and less than the vapor pressure of ammonia above the ammonium phosphate which contains one mol more ammonia than that occurring in the ammonium phosphate being formed where such a compound exists, at the temperature of the reaction zone.

6. Step in the process of making an ammoniated superphosphate, containing an ammonium phosphate free from other ammonium phosphates, from a calcium containing material, selected from the group comprising phosphate rock and a calcium carbonate, and concentrated phosphoric acid, which comprises, contacting dispersed spherical particles of a fluid, partially reacted mixture of a fine calcium containing compound and concentrated phosphoric acid with a mixture of inert gas and ammonia containing ammonia in such proportions that the partial pressure of the ammonia is greater than the vapor pressure of ammonia above the ammonium phosphate being formed and less than the vapor pressure of ammonia above the ammonium phosphate which contains one mol more ammonia than that occurring in the ammonium phosphate being formed where such a compound exists, at the temperature of the reaction zone.

HARRY A. CURTIS.